(12) United States Patent
Burnett et al.

(10) Patent No.: US 7,396,133 B2
(45) Date of Patent: Jul. 8, 2008

(54) SYSTEM AND METHOD FOR SELF-ALIGNING COLLAPSIBLE DISPLAY

(75) Inventors: William Robert Burnett, Menlo Park, CA (US); Michael O'Connor, Cupertino, CA (US); John Dick Gilbert, Applegate, OR (US)

(73) Assignee: N-Lighten Technologies, Fremont, CA (US)

( * ) Notice: Subject to any disclaimer, the term of this patent is extended or adjusted under 35 U.S.C. 154(b) by 140 days.

(21) Appl. No.: 10/907,552

(22) Filed: Apr. 5, 2005

(65) Prior Publication Data

US 2006/0119800 A1    Jun. 8, 2006

Related U.S. Application Data

(60) Provisional application No. 60/593,062, filed on Dec. 6, 2004.

(51) Int. Cl.
*G03B 21/00* (2006.01)
*G03B 21/22* (2006.01)

(52) U.S. Cl. ............................................ 353/69; 353/77
(58) Field of Classification Search .................. 353/69, 353/70, 77, 78, 121
See application file for complete search history.

(56) References Cited

U.S. PATENT DOCUMENTS

| 6,196,687 | B1 * | 3/2001 | Smith | 353/31 |
| 6,412,956 | B2 * | 7/2002 | Fujita et al. | 353/122 |
| 6,817,722 | B1 * | 11/2004 | Cole et al. | 353/69 |
| 7,052,142 | B2 * | 5/2006 | Gupta | 353/46 |
| 2005/0280781 | A1 * | 12/2005 | Tseng et al. | 353/74 |
| 2006/0072843 | A1 * | 4/2006 | Johnston | 382/254 |

OTHER PUBLICATIONS

Jose Dees, International Search Report and Written Opinion in PCT/US05/33739, May 10, 2007, ISA/US.

\* cited by examiner

*Primary Examiner*—Rodney E Fuller
(74) *Attorney, Agent, or Firm*—Thelen Reid Brown Raysman & Steiner; Aaron Wininger

(57) ABSTRACT

A display and method enable the auto-alignment and auto focus of an image onto a large screen in a projection display.

17 Claims, 4 Drawing Sheets

SYSTEM AND METHOD FOR SELF-ALIGNING COLLAPSIBLE DISPLAY

CROSS REFERENCE TO RELATED APPLICATION

This application claims benefit of and incorporates by reference U.S. patent application Ser. No. 60/593,062, entitled "Self Aligning Collapsible Projection Display System," filed on Dec. 6, 2004.

TECHNICAL FIELD

This invention relates generally to display equipment, and more particularly, but not exclusively, provides a system and method for a collapsible display capable of aligning components to ensure substantially optimal focus and alignment.

BACKGROUND

One of the most efficient methods for making a large display is to use projected images. Conventionally, the most advanced projection systems use imaging devices such as digital micro-mirror (DMD), Liquid Crystal on Silicon (LCoS), or transmissive LCD micro-displays. Typically, one or two fold mirrors are used in projection displays in order to fold the optical path and make a portion of it vertical to reduce the cabinet depth of projection displays. In a single fold mirror rear projection display, the light engine converts digital images to optical images with one or more microdisplays, and then projects the optical image to a large mirror which relays the optical images through a rear projection screen to a viewer in front of the screen. The light engine also manages light colors to yield full color images and magnifies the image. In a two fold mirror rear projection display, the projected optical images from the light engine are reflected off of a first fold mirror to a second fold mirror, and then through the rear projection screen to a viewer. The two fold mirror structure provides additional reduction in TV cabinet depth over one fold mirror structures, but typically requires additional cabinet height below the screen. The height of the cabinet below the screen is called chin height and it grows as the light engine projects to a first fold mirror typically positioned below the screen.

Because the imaging devices in projection displays are small, typically less than 1" in diagonal, they are inexpensive to manufacture. However, the small images generated by the imaging devices require magnification factors up to 100 in order to yield the 50"-80" diagonal image typical in consumer projection televisions. This high magnification makes the alignment of optical elements in these projection systems critical to final image quality. If the position of the light engine, the large mirror, and/or small mirror changes relative to the screen, the image quality will suffer. A change in any of the relative relationships between these elements from the nominal design can result in image keystoning or distortion, image rotation or shifting from its best position on the screen, or a loss of image focus. Therefore, special care is taken in manufacturing to insure precise alignment of the display optics.

The depth of these rear projection displays varies with their diagonal size, but with conventional optics the typical ratio of screen diagonal to cabinet depth is 2.5-3.5.:1. Thus, a 70" diagonal display will be 23" deep, and a 55" diagonal display will have a depth of 18.3". Large projection displays are extremely difficult to handle, expensive to transport, and, because of their size and fragility, their optical alignment can be easily disrupted when they shipped from manufacturer to the dealer or customer, or when moved from room to room in use. Once out of alignment, these displays typically need to be returned to the manufacturer to be realigned, or if that is impractical, the manufacturer pays for an expensive on-site service call. Often, the customer accepts a display with a poor quality image because it is too difficult or expensive to repair. Additionally, because each cabinet configuration must be aligned at the factory, it is impractical for a manufacturer to provide custom display sizes to match a customer's requirements.

Accordingly, a new system and method are needed that overcome the above-mentioned deficiencies in a cost efficient manner.

SUMMARY

The purpose of this invention is to enable the customer to select a custom rear projection display size that uniquely fits their home or business. This custom display is then manufactured, delivered and installed in their home or office. This invention allows custom displays to be manufactured, packaged and shipped in a collapsed form, installed, and automatically self aligned and optimized yielding optimum image quality. Self alignment and optimization allows the rear projection display cabinet to be shipped and transported in a collapsed state, and the light engine or projector to be shipped and transported outside of the custom display cabinet.

In an embodiment of the invention, the display comprises a light engine, a first mirror, a feedback camera and electronics. The light engine projects an optical test image based on a digital test image. The first mirror is positioned to reflect the optical test image onto a screen. The feedback camera positioned to capture at least a portion of the optical test image. The electronics, which are communicatively coupled to the feedback camera, compare the captured image with the digital test image and generate at least one of a focus or alignment adjustment (e.g., correction) based on the comparing.

In an embodiment of the invention, the method comprises: projecting an optical test image based on a digital test image; reflecting the optical test image onto a screen; capturing at least a portion of the optical test image; comparing the captured image with the digital test image; and generating at least one of a focus or alignment adjustment based on the comparing.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
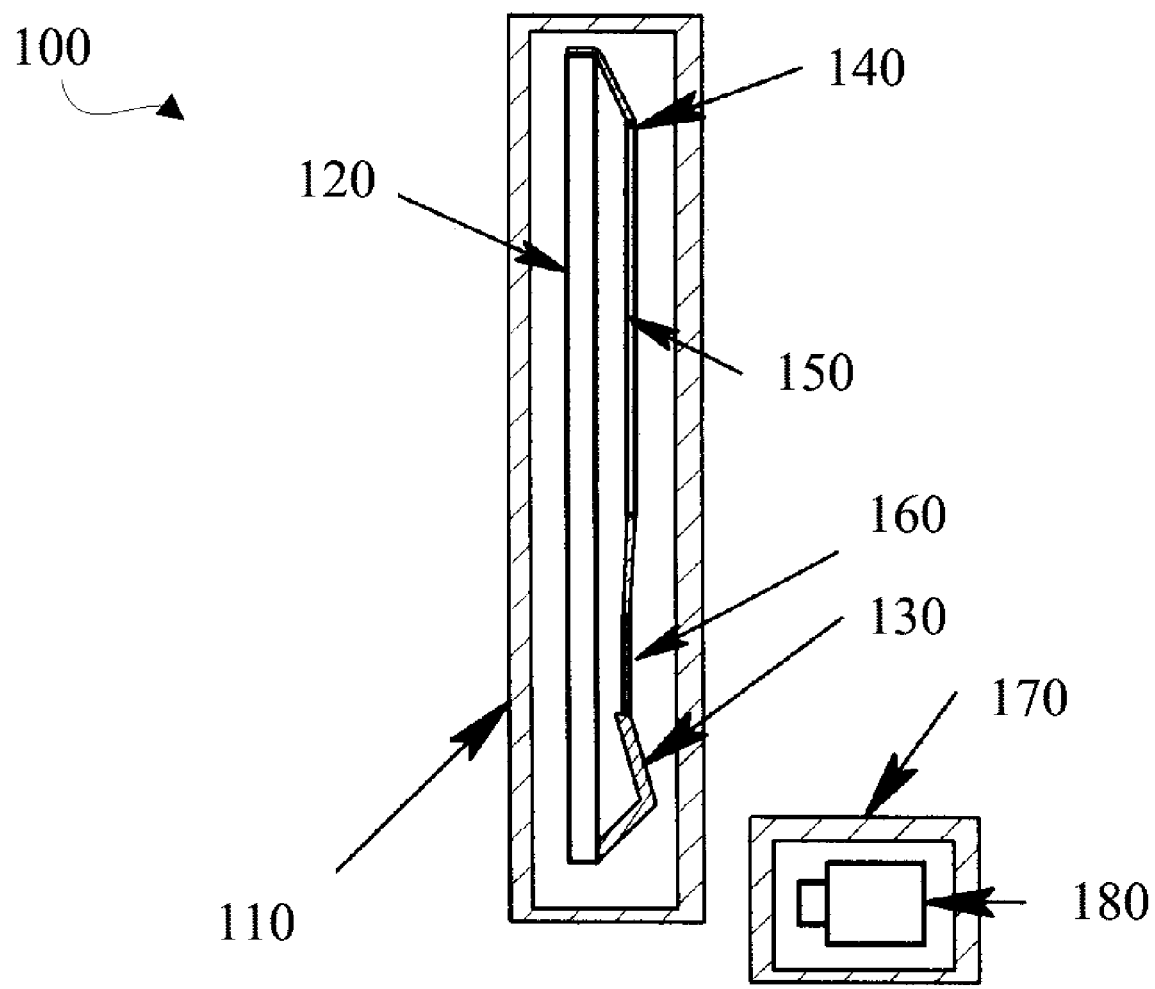
FIG. 1 is a diagram illustrating a collapsed and packaged display according to an embodiment of the invention.

FIG. 1 is a diagram illustrating a collapsed and packaged display 100 according to an embodiment of the invention. The packaged display 100 includes a first (compact) packaging 110 enclosing a cabinet front and projection screen 120, a lower cabinet housing 130, a rear cabinet housing 140, a large mirror 150, and a small mirror 160. The packaged display 100 also includes a second packaging (shipping enclosure) 170 housing a light engine 180. In an embodiment of the invention, the first packaging 110 and the second packaging 170 can hold different elements. In an embodiment of the invention, the first packaging 110 and the second packaging 170 can be combined into a single packaging. Display assembly and installation of the packaged display 100 comprises: cabinet expansion and assembly, light engine installation, power-up self test, and self alignment and image optimization. In an embodiment of the invention, these routines are embedded in electronics within the display 100, as will be discussed further below.

The collapsed and packaged display 100 enables easier shipment since the collapsed and packaged display 100 takes up less volume. Accordingly, more packaged displays 100 than conventional displays can be shipped in a single shipping container, thereby lowering shipping costs. Further, because shipping costs are lower, manufacturing can be done in countries having lower labor costs without the shipping costs eating up any labor costs savings. In addition, the ability to collapse and package the display 100 enables installation in locations with narrow entryways as compared to conventional large displays, which may not fit through doors or tight corridors.

Figure 2:
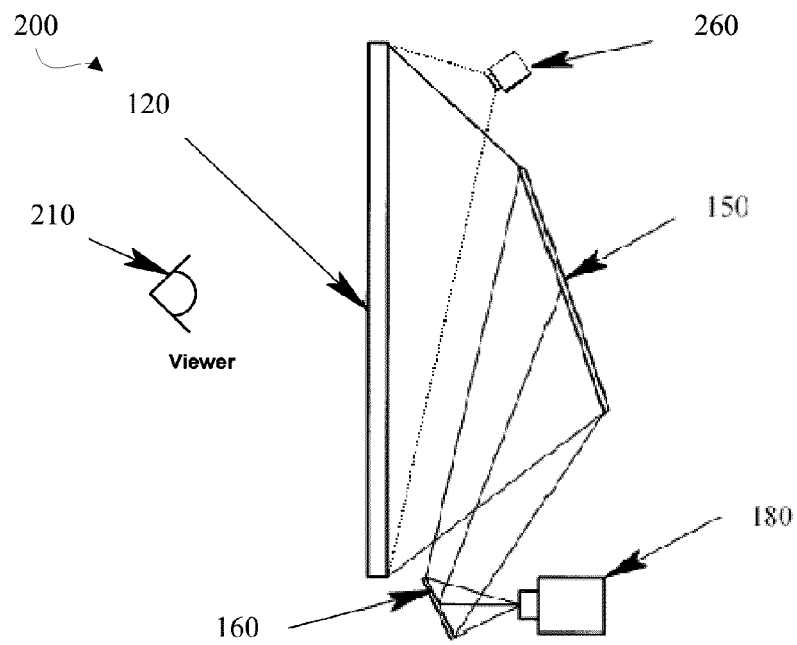
FIG. 2 is a diagram illustrating an assembled two mirror display having a feedback camera.

FIG. 2 is a diagram illustrating an assembled two mirror display 200 having a feedback camera or cameras 260. The assembled display 200 includes a light engine 180 that projects an image onto the small mirror 160, which reflects the image onto the large mirror 150, which reflects it onto the screen 120. A feedback camera is 260 is positioned to capture at least a portion of the projected image reflected from a back surface of the screen 120. As will be discussed further below, alignment and optimization of the projected image is performed using data from the feedback camera 260 by adjustments made to: 1) the mirror positions, 2) the light engine position, 3) lens positions and/or 4) preprocessing the digital video images to remap the image on the final viewing surface.

Figure 3:
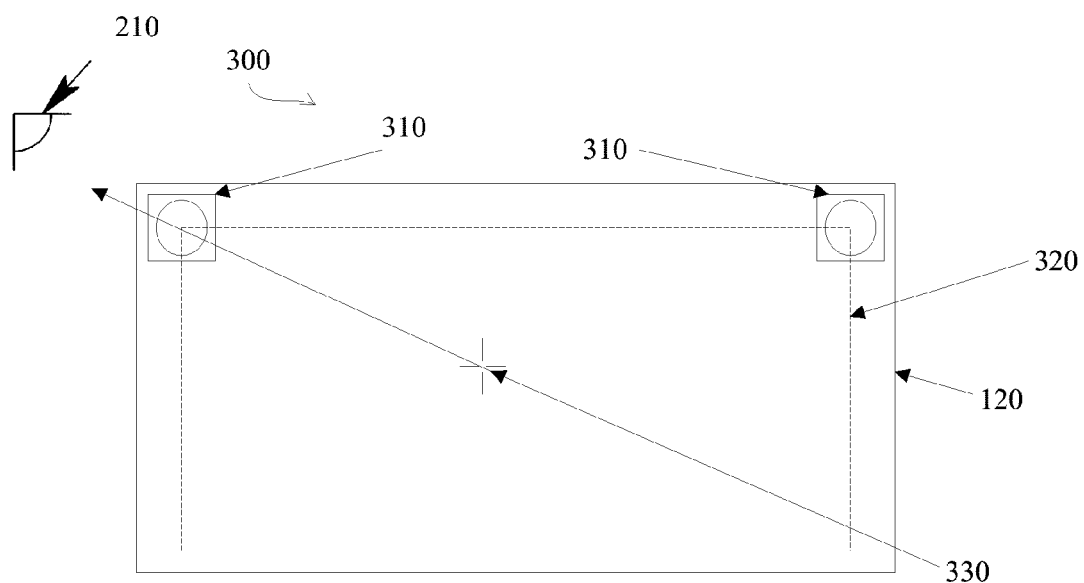
FIG. 3 is a diagram illustrating two camera chips intercepting portions of an image projected toward a screen and the viewer.

FIG. 3 is a diagram illustrating an assembled two mirror display 300 having two feedback cameras 310. A projected image 330 from the light engine 180 is projected on the active area 320 of the screen 120 and passes through where it is viewed by the viewer 210. Feedback cameras 310 are situated at the (top) corners of the active image area 320 of the screen 120. These cameras 310 are aligned substantially outside of the active area 330 of the screen 120 during normal TV operation. During the automatic alignment and image optimization process the cameras 310 are moved toward the center of the screen to partially overlap the active area 320. In this partial overlap configuration the cameras 310 intercept a portion of the projected image 330. This portion of the projected image 330 may contain special alignment and test images with lines, dots, and patterns in different colors. Additionally, the different colors (red, green, and blue) of the projected image 330 intercepted by the cameras 310 may be misaligned. Thus, the cameras 310 are situated to capture this misalignment enabling the display system 300 to calculate an optimization image for all colors.

Figure 4:
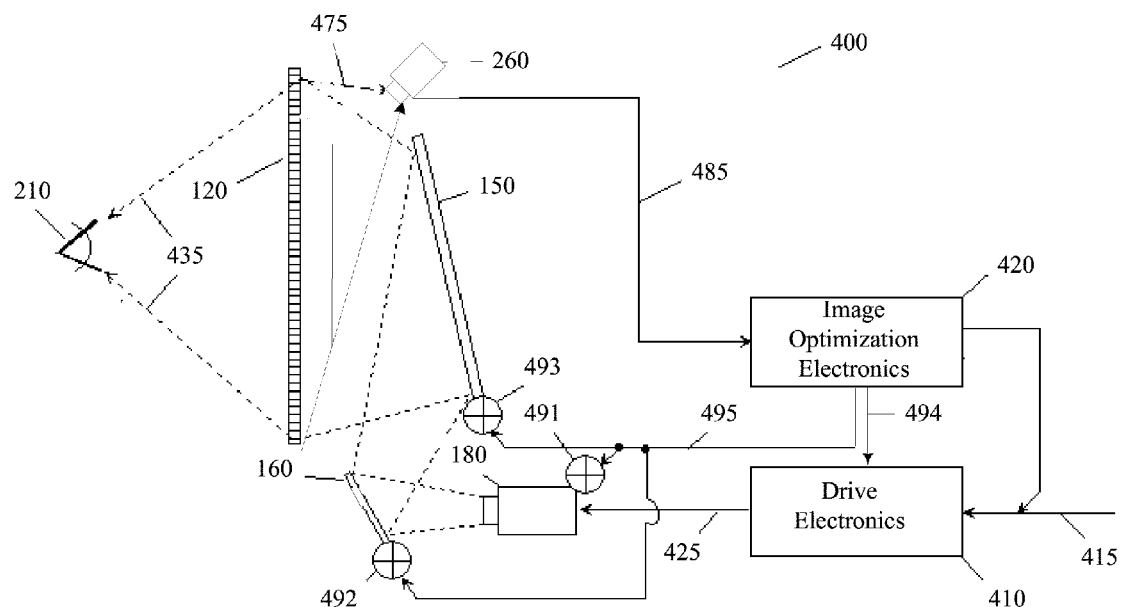
FIG. 4 is a diagram illustrating a display according to an embodiment of the invention.

FIG. 4 is a diagram illustrating a display 400 according to an embodiment of the invention. The display 400 is substantially representative of the display 200. The display 400 includes a light engine 180 positioned to project an image onto the small mirror 160, which reflects the image onto the large mirror 150, which reflects the image onto the screen 120. Coupled to the light engine 180, small mirror 160 and the large mirror 150 are actuators 491, 492 and 493, respectively. A feedback camera or cameras 260 are positioned to image at least a portion of the screen 120 as shown in FIG. 2. The feedback camera 260 is communicatively coupled, via a camera interface line 485, to image optimization electronics 420, which is communicatively coupled to the actuators 491, 492, and 493, via an actuator control line 495, and to video drive electronics 410 via an image remapping line 494. The drive electronics 410 is communicatively coupled to the light engine 180 via a light engine video interface 425. The drive electronics 410 also receives image data via a video interface 415 from the image optimization electronics 420 and a video source (e.g., cable box, satellite receiver, etc.).

Alignment and optimization of the projection display's optical system 400 begins with the image optimization electronics 420 generating an alignment and test digital image in a first color out of the possible primary red, green or blue colors and is repeated for each color in turn. However, the system is not limited to only three primaries or color channels. In principal there can be many other primary colors such as yellow, cyan, and purple. Further, the digital test image may be done in a single color or in several colors simultaneously as in the case of use of a full color test image with red, green and blue image data.

The digital test images are provided over the display system video interface 415 to the drive electronics 410. Here, the digital images are formatted and provided over the light engine video interface 425 to the light engine 180. The light engine 180 generates corresponding optical images 435 and reflects them off of a first mirror 160, then off of a second mirror 150, to the rear side of the rear projection screen 120 and to the viewer 210 in front of the screen 120.

Some light 475 from the projected optical test images 435 reflects from of the rear side of the projection screen 120 and is intercepted by the camera 260. Digital images of this reflection 475 of the projected image are captured by the camera 260 and passed to the image optimization electronics 420 via the camera interface line 485. The image optimization electronics 420 then compares the captured test images with expected images, develops mirror and light engine actuator 492, 493 and 491 signals to adjust focus and alignment of the image, as well as processing the digital image data to develop data for remapping of the digital video to compensate for optical distortions. In an embodiment of the invention, the adjustments determined in order may be for focus, for optical component alignment, and for optical distortions, with test image projection and adjustments done sequentially.

Alignment and focus control signals are sent to the light engine position actuator 491, the small mirror position actuator 492, and/or the large mirror position actuator 493 over the actuator control line 495. Image remapping data is passed to the drive electronics 410 over the image remapping line 494. The focus control signals can adjust the focus of the light engine 180 by either adjusting the position of a light engine 180 (e.g., along an optical path) or by adjusting the position of elements within the light engine 180.

The system then measures the compensated projected image with the camera 260 again and repeats the process until the image quality meets some predefined threshold, or until the compensations no longer produce image quality improvements. This process is then repeated for the remaining colors to fully optimize the optical transfer function of the display. The process can repeated one more time with a white projection, white being made up of all the primary colors in the system being projected simultaneously.

These alignment and optimization techniques can as well be implemented with multiple camera chips directly capturing a portion of the projected image, or with any number of camera chips intercepting any portion of the image in the light path from the imagers inside of the light engine 180, or between the light engine 180 and the viewer 210, or even with a camera 260 positioned on the front side of the screen at the viewer's position 210.

The image optimization electronics 420 comprises a digital image processor that can interface with the camera 260, process the digital camera images to develop alignment and position adjustment signals for image alignment and focus adjustment via the light engine actuator 491, the small mirror actuator 492, and the large mirror actuator 493, and process the digital camera images for image remapping via the drive electronics 410. The drive electronics 410 and the image optimization electronics 420 will be discussed in further detail below.

This alignment and optimization process allows for several useful features. It allows the projection display system 400 to be made in arbitrary diagonal size increments, within the range of the optics of the engine 180, since the auto alignment feature can resize, refocus, position, and remap the optical image for a range of mirror sizes, positions and shapes to yield a desired final image size. This overcomes the limitations of a fixed manufacturing method for fixed screen sizes and allows the display to uniquely fit the home or office for which it was designed.

The projection display system 400 can be shipped around the world by various techniques without fear of going out of alignment and requiring service on-site or a return to the factory. Their built in auto alignment system will adjust for any misalignments caused by transportation and handling and therefore, significantly lower the warranty and return costs.

Since the display 400 has been factory aligned and can recalibrate itself in the field, the display 400 can be shipped to the retailer, home or office folded flat or disassembled. The projection display cabinet with mirrors and support fixtures can be packaged in a collapsed form as shown in FIG. 1. The light engine 180 with its mounting and alignment hardware can be packaged separately, as can the display electronics as shown in FIG. 1. This allows transportation to the store or customer in a more compact and efficient fashion. Once in the field, the display 400 can be unfolded or reassembled and self aligned.

At installation, the projection display system is expanded or reassembled, the light engine and display electronics are installed and tested, all by a low skilled laborer or end-user. The final alignment and optimization process is initiated yielding a fully operational projection display system that meets the original image quality specifications as if it were factory-built.

Figure 5:
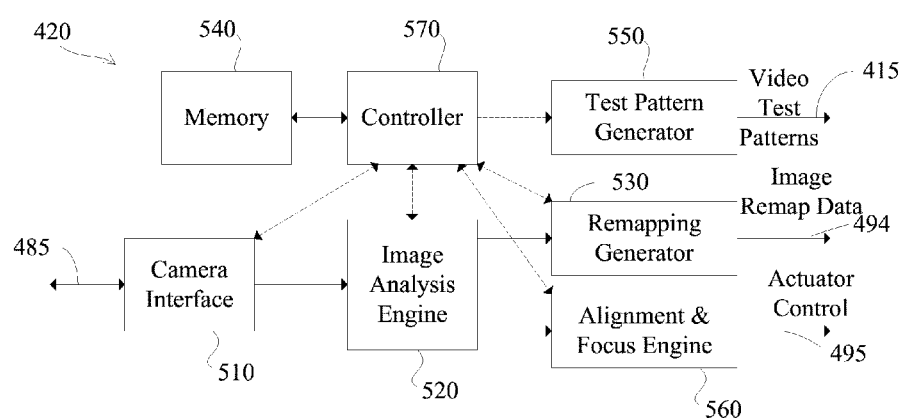
FIG. 5 is a diagram illustrating image optimization electronics of the display.

FIG. 5 is a diagram illustrating the image optimization electronics 420 of the display 400. The image optimization electronics 420 can be implemented as an ASIC or ASICS, software and/or via other techniques. The image optimization electronics 420 comprises a camera interface 510 communicatively coupled to the camera 260, an image analysis engine 520, and an alignment & focus engine 560. The image analysis engine 520 is also communicatively coupled to a remapping generator 530. The image optimization electronics 420 also comprises a controller 570 communicatively coupled to a test pattern generator 550, and memory 540. The controller is also communicatively coupled to the camera interface 510, remapping generator 530, the image analysis engine 520, and the alignment & focus engine 560.

The test pattern generator 550 receives digital test patterns from the controller 570 and generates the appropriate digital test image, which can include patterns, which are sent to the drive electronics 410 over the video interface 415 for projection onto the screen 120. The camera interface 510 then receives image data over the camera interface line 485 of at least a portion of the test image reflected by the screen and captured by the camera 260, and then passes the captured optical image to the image analysis engine 520. The image analysis engine 520 then analyzes the captured optical image and the digital test image to determine appropriate corrective actions.

Specifically, the image analysis engine 520 determines corrective focusing and alignment actions and issues commands to the alignment and focus engine 560, which in turn activates the actuator control lines 495 to exercise the light engine actuator 491, the small mirror actuator 492, and the large mirror actuator 493 in order to modify the optical alignment and focus of the display's optical elements 400. After the alignment and focusing adjustment is applied, the controller 570 causes the test pattern generator 550 to transmit a pattern or other image over the video interface 415 for display to the drive electronics 410 and the image analysis engine then compares the resulting captured image with the test pattern. The image analysis engine 520 then provides image transformation information to the remapping generator 530 which then generates pixel remapping data based on the image analysis engine's 520 comparison, and transmit the pixel remapping data over the image remapping line 494 to the mapping engine 610 (FIG. 6) in the drive electronics 410. It will be appreciated by one of ordinary skill in the art that the pixel remapping data can comprise any data structure (e.g., linking list) having mapping, image transformation, or other compensation data. Embodiments of the invention can use any type of image mapping or transformation algorithm, for example the spatial filtering algorithm described in Digital Image Processing, Gonzoalez, Raphael C., et al, Prentice Hall, Second Edition, 2002, pg 117, equation 3.5.1:

$$g(x, y) = \sum_{s=-a}^{a} \sum_{t=-b}^{b} w(s, t) f(x+s, y+t).$$

After this map generation process, the test pattern generator 550 generates and transmits a test image to the drive electronics 410 for projection. The image analysis engine 520 then compares the received digital image with the test pattern in order to determine if the resulting image quality meets some predefined criteria, and either end the image optimization process, or continue with other iterations of alignment, focus, and image transformation optimizations.

In an embodiment of the invention, the alignment, focusing, and mapping (or a subset thereof) can be performed in a different order, simultaneously, and/or for multiple colors, a single color, etc. In another embodiment of the invention, the alignment, focusing, and mapping, (or a subset thereof) can be performed in an iterative fashion such that a first adjustment is applied and the suitability of the adjustment is then tested via imaging the same or different test pattern after the adjustment is applied. A second adjustment can then be applied and the second adjustment tested and the process repeated until the adjustment is deemed appropriate. In another embodiment of the invention, the adjustments can be done once (e.g., at installation), whenever initiated by a viewer, whenever the display is turned on, and/or during the display of any non-test images (e.g., a football game) by interspersing a frame of a test image between frames of the non-test images such that the viewer does not notice the test image. The feedback camera 260 can capture the test image between the non-test image frames and the above-mentioned adjustments can then take place.

Figure 6:
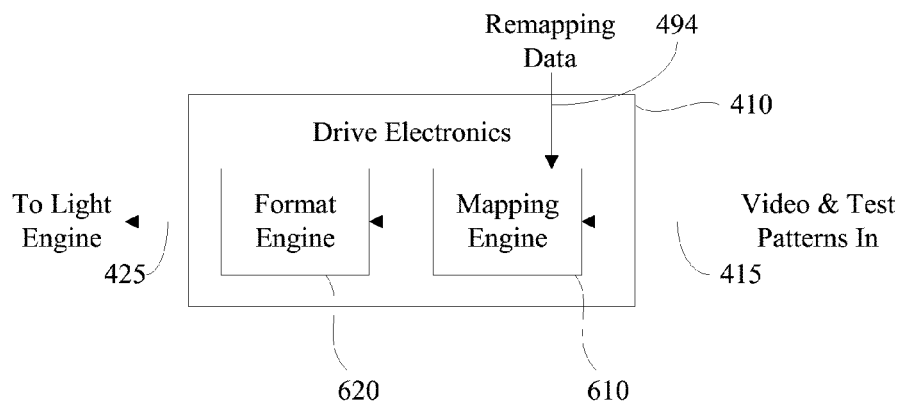
FIG. 6 is a diagram illustrating video drive electronics of the display.

FIG. 6 is a diagram illustrating drive electronics 410 of the display 400. The drive electronics 410 can be implemented in software, as an ASIC or ASICs, and/or via other techniques. The drive electronics 410 includes a mapping engine 610 communicatively coupled to a format engine 620. The mapping engine 610 receives video image input from the video interface 415 communicatively coupled to a receiver (e.g., cable box, satellite receiver, etc.) and to the test pattern generator 550 of the image optimization electronics 420. The mapping engine 610 also receives, from the remapping generator 530 image remapping or transformation data (or other data structure holding mapping and/or transformation data) for mapping input video images. The mapping engine 610 uses the data to remap the received video data and feeds the remapped video to the format engine 620, which formats the mapped video into a format usable by the light engine 180. The format engine 620 then passes the formatted images to the light engine 180, which then projects an image, as described by above.

Figure 7:
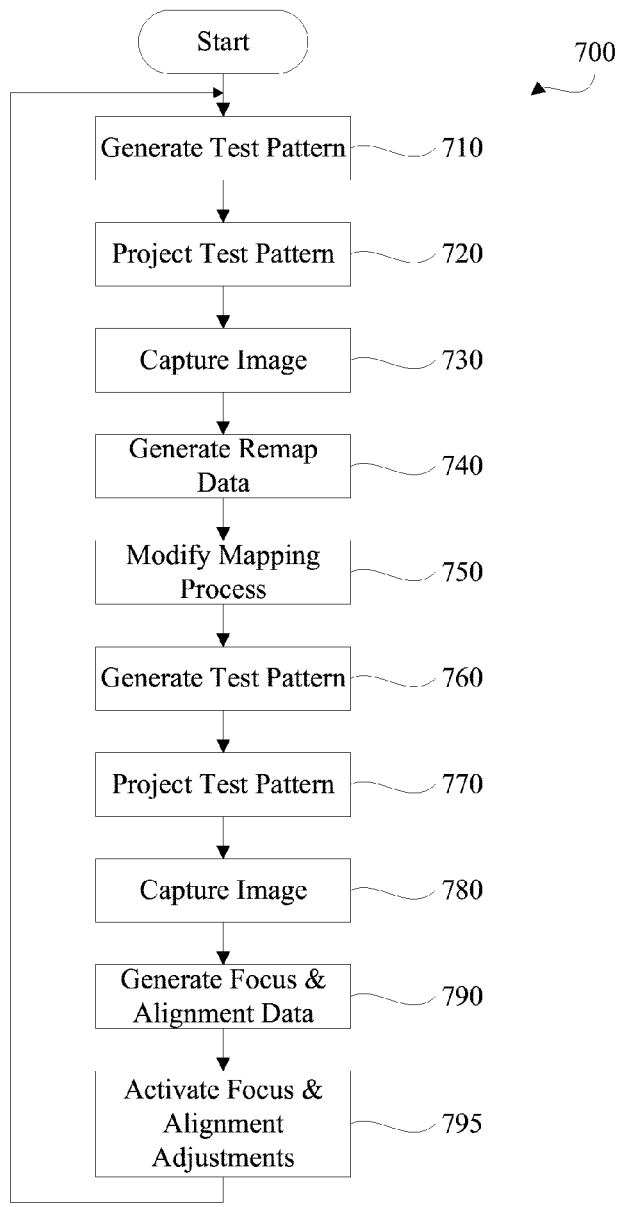
FIG. 7 is a flowchart illustrating a method of correcting an image on a display.

FIG. 7 is a flowchart illustrating a method 700 of correcting an image on a display. In an embodiment of the invention, the display 400 implements the method 700. First, a test pattern image is generated (710) and projected (720). At least a portion of the displayed image is then captured (730) by an optical device, such as a camera. Remapping data for the image is then generated (740), if necessary, by comparing the captured image with the test image generated. This remapping of the digital video images can compensate for image distortions such as those arising from imperfect optics in the light engine and projection lens and imperfect mirrors (intended and accidental). After generating (740) the remap data, the data is used to modify the mapping process (750) in the mapping engine 610 in the drive electronics 410 to carry out the mapping adjustment. A second test pattern is then generated (760), projected (770), and captured (780). Alignment and focus adjustment data is then generated (790) and alignment and focus adjustments are activated (795) in the light engine (e.g., the actuator 491 to adjust light engine 180 alignment, the actuator 492 to adjust small mirror 160 alignment, and the actuator 493 to adjust large mirror 150 alignment). The method 700 can then be repeated. In an embodiment of the invention, the method 700 can repeat continuously until the adjustments are deemed acceptable and all adjustments are applied (e.g., focus, color, alignment, and mapping). In an embodiment of the invention, the method 700 can be repeated for running a single test and adjustment at a time, e.g., focus, then mapping, and then alignment. In another embodiment, all adjustments can be determined substantially simultaneously. In another embodiment of the invention, a feedback camera adjustment can be applied to the captured image after the capturing (720) to adjust for any errors in the data introduced by the feedback camera.

The foregoing description of the illustrated embodiments of the present invention is by way of example only, and other variations and modifications of the above-described embodiments and methods are possible in light of the foregoing teaching. For example, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A packaged display for shipment, comprising:
   a first package having
      a light engine for projecting an optical test image based on a digital test image; and
   a second package having
      a first mirror, when the display is unpackaged and assembled, positioned to reflect the optical test image onto a screen;
      a feedback camera, when the display is unpackaged and assembled, positioned to capture at least a portion of the optical test image; and
      electronics, communicatively coupled to the feedback camera, for comparing the captured image with the digital test image, and generating at least one of a focus or alignment adjustment based on the comparing so as to correct for mis-positioning of the first mirror or the light engine from assembly after shipment, the electronics further for remapping video data to correct for optical distortion based on the comparing;
      wherein non-test images are interspersed with optical test images.

2. The display of claim 1, wherein the second package further has a second mirror positioned to reflect the optical test image from the light engine onto the first mirror.

3. The display of claim 2, wherein the alignment adjustment includes an alignment adjustment of the first or second mirror.

4. The display of claim 2, further comprising actuators coupled to the first and second mirrors and wherein the electronics are further capable of transmitting the adjustment to at least one of the actuators.

5. The display of claim 1, wherein the focus adjustment includes adjusting the focus of the light engine by either adjusting the position of the light engine or by adjusting the position of elements within the light engine.

6. The display of claim 1, further comprising an actuator coupled to the light engine and wherein the alignment adjustment is sent to the actuator to align the light engine.

7. The display of claim 1, wherein the electronics are activated when the display is powered on.

8. A packaged display for shipment, comprising:
   a first package having
      a light engine for projecting an optical test image based on a digital test image; and
   a second package having
      a first mirror, when the display is unpackaged and assembled, positioned to reflect the optical test image onto a screen;

a feedback camera, when the display is unpackaged and assembled, positioned to capture at least a portion of the optical test image; and electronics, communicatively coupled to the feedback camera, for comparing the captured image with the digital test image, and generating at least one of a focus or alignment adjustment based on the comparing so as to correct for mis-positioning of the first mirror or the light engine from assembly after shipment, the electronics farther for remapping video data to correct for optical distortion based on the comparing;

wherein the electronics generates, in order, a focus adjustment, a remapping adjustment, and an alignment adjustment.

9. A packaged display for shipment, comprising:

a first package having
  means for projecting an optical test image based on a digital test image; and
a second package having
  means for reflecting the optical test image onto a screen;
  means for capturing at least a portion of the optical test image;
  means for comparing the captured image with the digital test image; and
  means for generating at least one of a focus or alignment adjustment based on the comparing so as to correct for mis-positioning of the means for reflecting or the means for projecting from assembly after shipment and for remapping video data to correct for optical distortion based on results from the means for comparing;
  wherein the means for projecting intersperses non-test images with optical test images.

10. A method for assembling a display after shipment, comprising:

assembling a display from two packages after shipment,
  the first package having
    a light engine; and
  the second package having
    a first mirror,
    a feedback camera, and
    electronics,
projecting an optical test image using the light engine based on a digital test image;
reflecting the optical test image with the first mirror onto a screen;
capturing at least a portion of the optical test image with the feedback camera;
comparing the captured image with the digital test image with the electronics;
generating at least one of a focus or alignment adjustment based on the comparing with the electronics so as to correct for mis-positioning of the first mirror or the light engine from assembly after shipment; and
remapping video data to correct for optical distortion based on the comparing;
wherein the projecting intersperses non-test images with optical test images.

11. The method of claim 10, wherein the reflecting comprises reflecting the optical test image from a first mirror onto a second mirror and reflecting the optical test image from the second mirror onto the screen.

12. The method of claim 11, wherein the alignment adjustment includes an alignment adjustment of the first or second mirror.

13. The method of claim 11, wherein actuators are coupled to the first and second mirrors and the method further comprises transmitting the adjustment to at least one of the actuators.

14. The method of claim 10, wherein the focus adjustment includes adjusting the focus of the light engine by either adjusting the position of a light engine that projects the optical test image or by adjusting the position of elements within the light engine.

15. The method of claim 10, further comprising transmitting the alignment adjustment to an actuator coupled to the light engine to align the light engine.

16. The method of claim 10, wherein the method is carried out within a display when the display is powered on.

17. A method for assembling a display after shipment, comprising:

assembling a display from two packages after shipment,
  the first package having
    a light engine; and
  the second package having
    a first mirror,
    a feedback camera, and
    electronics,
projecting an optical test image using the light engine based on a digital test image;
reflecting the optical test image with the first mirror onto a screen;
capturing at least a portion of the optical test image with the feedback camera;
comparing the captured image with the digital test image with the electronics;
generating at least one of a focus or alignment adjustment based on the comparing with the electronics so as to correct for mis-positioning of the first mirror or the light engine from assembly after shipment; and
remapping video data to correct for optical distortion based on the comparing;
wherein the generating a focus adjustment, remapping video data, and generating an alignment adjustment are done in order.

* * * * *